(12) United States Patent
Kucerova et al.

(10) Patent No.: US 12,161,998 B2
(45) Date of Patent: Dec. 10, 2024

(54) CATALYTICALLY ACTIVE PARTICULATE FILTER

(71) Applicant: UMICORE AG & CO. KG, Hanau-Wolfgang (DE)

(72) Inventors: Gabriela Kucerova, Senden (DE); Jan Schoenhaber, Darmstadt (DE); Naina Deibel, Pfungstadt (DE); Meike Gotthardt, Frankfurt (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 635 days.

(21) Appl. No.: 17/599,260

(22) PCT Filed: Mar. 29, 2019

(86) PCT No.: PCT/EP2019/057995
§ 371 (c)(1),
(2) Date: Sep. 28, 2021

(87) PCT Pub. No.: WO2020/200398
PCT Pub. Date: Oct. 8, 2020

(65) Prior Publication Data
US 2022/0176355 A1     Jun. 9, 2022

(51) Int. Cl.
*B01J 23/63*     (2006.01)
*B01D 53/94*     (2006.01)
(Continued)

(52) U.S. Cl.
CPC ............ *B01J 23/63* (2013.01); *B01D 53/945* (2013.01); *B01J 23/10* (2013.01); *B01J 35/19* (2024.01);
(Continued)

(58) Field of Classification Search
None
See application file for complete search history.

(56) References Cited

U.S. PATENT DOCUMENTS

| 4,335,023 A | 6/1982 | Dettling et al. |
| 6,228,799 B1 | 5/2001 | Aubert et al. |

(Continued)

FOREIGN PATENT DOCUMENTS

| CN | 1473651 A | 2/2004 |
| CN | 1935368 A | 3/2007 |

(Continued)

OTHER PUBLICATIONS

English Translation of Chinese First Office Action dated Aug. 10, 2022 for CN 201880081996.X (9 pages).
(Continued)

*Primary Examiner* — Jelitza M Perez
(74) *Attorney, Agent, or Firm* — Smith, Gambrell & Russell, LLP

(57) ABSTRACT

The present invention relates to a particulate filter for removing particles, carbon monoxide, hydrocarbons and nitrogen oxides from the exhaust gas from internal combustion engines operated with a stoichiometric air-fuel mixture. Two coatings Y and Z are located in the porous walls and are present from the first end of the wall-flow filter over the entire length L of the particulate filter. Both contain active alumina, at least one cerium-zirconium-rare earth metal mixed oxide and at least one platinum group metal.

20 Claims, 1 Drawing Sheet

(51) Int. Cl.
  *B01J 23/10*     (2006.01)
  *B01J 35/00*     (2006.01)
  *B01J 35/56*     (2024.01)
  *F01N 3/022*     (2006.01)

(52) U.S. Cl.
  CPC .............. *B01J 35/56* (2024.01); *F01N 3/022* (2013.01); *B01D 2255/1021* (2013.01); *B01D 2255/1023* (2013.01); *B01D 2255/1025* (2013.01); *B01D 2255/2061* (2013.01); *B01D 2255/2063* (2013.01); *B01D 2255/2066* (2013.01); *B01D 2255/2092* (2013.01); *B01D 2255/407* (2013.01); *B01D 2255/908* (2013.01); *B01D 2255/9155* (2013.01)

(56) References Cited

U.S. PATENT DOCUMENTS

| | | |
|---|---|---|
| 6,294,140 B1 | 9/2001 | Mussmann et al. |
| 6,348,430 B1 | 2/2002 | Lindner et al. |
| 7,722,829 B2 | 5/2010 | Punke et al. |
| 7,871,452 B2 | 1/2011 | Yamada et al. |
| 7,964,527 B2 | 6/2011 | Larcher et al. |
| 7,977,275 B2 | 7/2011 | Pfeifer et al. |
| 8,007,750 B2 | 8/2011 | Chen et al. |
| 8,012,439 B2 | 9/2011 | Arnold et al. |
| 8,066,963 B2 | 11/2011 | Klingmann et al. |
| 8,080,208 B2 | 12/2011 | Kim |
| 8,119,075 B2 | 2/2012 | Dettling et al. |
| 8,397,488 B2 | 3/2013 | Woerz et al. |
| 8,524,185 B2 | 9/2013 | Caudle et al. |
| 8,640,440 B2 | 2/2014 | Klingmann et al. |
| 8,663,588 B2 | 3/2014 | Lindner et al. |
| 8,722,000 B2 | 5/2014 | Boorse |
| 8,932,546 B2 | 1/2015 | Frantz et al. |
| 8,940,259 B2 | 1/2015 | Brown et al. |
| 8,956,994 B2 | 2/2015 | Ifrah et al. |
| 9,051,857 B2 | 6/2015 | Dornhaus et al. |
| 9,156,023 B2 | 10/2015 | Klingmann et al. |
| 9,174,198 B2 | 11/2015 | Kawabata et al. |
| 9,238,982 B2 | 1/2016 | Springer et al. |
| 9,266,092 B2 | 2/2016 | Arnold et al. |
| 9,327,239 B2 | 5/2016 | Morgan |
| 9,347,349 B2 | 5/2016 | Blakeman et al. |
| 9,352,279 B2 | 5/2016 | Greenwell |
| 9,394,816 B2 | 7/2016 | Nakayama et al. |
| 9,517,462 B2 | 12/2016 | Roesch et al. |
| 9,581,063 B2 | 2/2017 | Klingmann et al. |
| 9,789,443 B2 | 10/2017 | Greenwell |
| 10,071,342 B2 | 9/2018 | Schoenhaber et al. |
| 10,071,368 B2 | 9/2018 | Onoe et al. |
| 10,076,725 B2 | 9/2018 | Onoe et al. |
| 10,125,649 B2 | 11/2018 | Onoe et al. |
| 10,159,934 B2 | 12/2018 | Kitamura et al. |
| 10,201,805 B2 | 2/2019 | Ohashi et al. |
| 10,344,655 B2 | 7/2019 | Onoe et al. |
| 10,357,744 B2 | 7/2019 | Ohashi et al. |
| 10,413,886 B2 | 9/2019 | Despres et al. |
| 10,618,034 B2 | 4/2020 | Kasuya et al. |
| 10,625,243 B2 | 4/2020 | Clowes et al. |
| 10,814,311 B2 | 10/2020 | Hoshino et al. |
| 10,933,373 B2 | 3/2021 | Deibel et al. |
| 11,097,260 B2 | 8/2021 | Kurihara et al. |
| 11,179,676 B2 | 11/2021 | Schoenhaber et al. |
| 11,185,820 B2 | 11/2021 | Schoenhaber et al. |
| 11,187,129 B2 | 11/2021 | Nomura et al. |
| 11,208,931 B2 | 12/2021 | Kurihara et al. |
| 11,266,982 B2 | 3/2022 | Kurihara et al. |
| 11,291,952 B2 | 4/2022 | Schoenhaber et al. |
| 11,400,414 B2 | 8/2022 | Deibel et al. |
| 11,623,179 B2 | 4/2023 | Schoenhaber et al. |
| 11,628,400 B2 | 4/2023 | Schoenhaber et al. |
| 11,702,971 B2 | 7/2023 | Schoenhaber et al. |
| 2004/0065078 A1 | 4/2004 | Schafer-Sindlinger et al. |
| 2006/0057046 A1 | 3/2006 | Punke et al. |
| 2006/0142151 A1 | 6/2006 | Taki et al. |
| 2007/0093381 A1 | 4/2007 | Miyoshi et al. |
| 2008/0090723 A1 | 4/2008 | Okamoto et al. |
| 2009/0193796 A1 | 8/2009 | Wei et al. |
| 2010/0055012 A1 | 3/2010 | Grisstede et al. |
| 2010/0275579 A1 | 11/2010 | Klingmann et al. |
| 2010/0319332 A1 | 12/2010 | Jeske et al. |
| 2011/0030346 A1 | 2/2011 | Neubauer et al. |
| 2011/0094207 A1 | 4/2011 | Woerz et al. |
| 2011/0179777 A1 | 7/2011 | Chandler et al. |
| 2011/0252773 A1 | 10/2011 | Arnold et al. |
| 2012/0304623 A1 | 12/2012 | Springer et al. |
| 2013/0142713 A1* | 6/2013 | Ifrah ................... C01G 25/00 423/213.2 |
| 2013/0143732 A1 | 6/2013 | Aoki |
| 2014/0234189 A1 | 8/2014 | Clowes et al. |
| 2014/0140899 A1 | 11/2014 | Gabrielsson et al. |
| 2017/0122176 A1* | 5/2017 | Nomura ................... B01J 35/56 |
| 2017/0296969 A1 | 10/2017 | Ohashi et al. |
| 2017/0304773 A1 | 10/2017 | Onoe et al. |
| 2017/0368536 A1 | 12/2017 | Despres et al. |
| 2018/0021767 A1 | 1/2018 | Onoe et al. |
| 2018/0119589 A1 | 5/2018 | Chandler et al. |
| 2018/0178198 A1 | 6/2018 | Deeba et al. |
| 2019/0120104 A1 | 4/2019 | Inoda et al. |
| 2020/0094189 A1 | 3/2020 | Deibel et al. |
| 2020/0188887 A1 | 6/2020 | Kobayashi et al. |
| 2020/0306693 A1 | 10/2020 | Schoenhaber et al. |
| 2020/0316565 A1 | 10/2020 | Fisher et al. |
| 2020/0362738 A1 | 11/2020 | Schoenhaber et al. |
| 2021/0069678 A1 | 3/2021 | Schoenhaber et al. |
| 2021/0079822 A1 | 3/2021 | Schoenhaber et al. |
| 2021/0086134 A1 | 3/2021 | Schoenhaber et al. |
| 2021/0086135 A1 | 3/2021 | Schoenhaber et al. |
| 2021/0236976 A1 | 8/2021 | Foerster et al. |
| 2021/0396167 A1 | 12/2021 | Foerster et al. |

FOREIGN PATENT DOCUMENTS

| | | |
|---|---|---|
| CN | 100427205 C | 10/2008 |
| CN | 101553304 A | 10/2009 |
| CN | 101626832 A | 1/2010 |
| CN | 102049191 A | 5/2011 |
| CN | 102196853 A | 9/2011 |
| CN | 102574056 A | 7/2012 |
| CN | 102808677 A | 12/2012 |
| CN | 102939445 A | 2/2013 |
| CN | 103127927 A | 6/2013 |
| CN | 104254387 A | 12/2014 |
| CN | 104271237 A | 1/2015 |
| CN | 104661730 A | 5/2015 |
| CN | 104785257 A | 7/2015 |
| CN | 104838099 A | 8/2015 |
| CN | 105008025 A | 10/2015 |
| CN | 105228730 A | 1/2016 |
| CN | 105793529 A | 7/2016 |
| CN | 105964253 A | 9/2016 |
| CN | 107107037 A | 8/2017 |
| CN | 107262090 A | 10/2017 |
| CN | 108295851 A | 7/2018 |
| CN | 108602050 A | 9/2018 |
| DE | 10 2005 005663 A1 | 8/2006 |
| DE | 10 2011 050788 A1 | 12/2012 |
| DE | 10 2013 207 415 A1 | 10/2013 |
| DE | 20 2010 018 081 U1 | 2/2014 |
| DE | 10 2014 104 748 A1 | 10/2014 |
| DE | 11 2013 002 163 | 1/2015 |
| DE | 10 2015 212 788 A1 | 1/2017 |
| DE | 10 2018 111246 A1 | 11/2019 |
| EP | 0 885 650 A2 | 12/1998 |
| EP | 1 046 423 A2 | 10/2000 |
| EP | 1 657 410 A2 | 5/2006 |
| EP | 1 726 359 A1 | 11/2006 |
| EP | 1 974 810 A1 | 10/2008 |
| EP | 2 042 225 A1 | 4/2009 |
| EP | 2 042 226 A2 | 4/2009 |
| EP | 1 974 809 B1 | 9/2010 |
| EP | 2 322 773 A1 | 5/2011 |
| EP | 2 623 183 A1 | 8/2013 |

(56) References Cited

FOREIGN PATENT DOCUMENTS

| | | | |
|---|---|---|---|
| EP | 2 650 042 A1 | 10/2013 |
| EP | 1 541 220 B1 | 2/2014 |
| EP | 2 948 653 A1 | 12/2015 |
| EP | 3 045 226 A1 | 7/2016 |
| EP | 3 162 428 A1 | 5/2017 |
| EP | 3 205 388 A1 | 8/2017 |
| EP | 3 207 977 A1 | 8/2017 |
| EP | 3 207 978 A1 | 8/2017 |
| EP | 3 207 987 A1 | 8/2017 |
| EP | 3 207 989 A1 | 8/2017 |
| EP | 3 207 990 A1 | 8/2017 |
| EP | 3 247 493 A1 | 11/2017 |
| EP | 3 254 757 A1 | 12/2017 |
| EP | 3 257 571 A1 | 12/2017 |
| EP | 3 406 322 | 11/2018 |
| FR | 3 020 091 A1 | 10/2015 |
| JP | 2014-117680 A | 6/2014 |
| JP | 2016-203116 A | 12/2016 |
| JP | 6487982 B1 | 3/2019 |
| WO | 95/35152 | 12/1995 |
| WO | 2008/000449 A2 | 1/2008 |
| WO | 2009/100097 A2 | 8/2009 |
| WO | 2011/015615 A1 | 2/2011 |
| WO | 2013/160678 A2 | 10/2013 |
| WO | 2014/125296 A1 | 8/2014 |
| WO | 2014/178633 A1 | 11/2014 |
| WO | 2015/082892 A2 | 6/2015 |
| WO | 2016/133085 A1 | 8/2016 |
| WO | 2016/133086 A1 | 8/2016 |
| WO | 2017/034920 A1 | 3/2017 |
| WO | 2017/109514 A1 | 6/2017 |
| WO | 2017/126631 A1 | 7/2017 |
| WO | 2017/209083 A1 | 12/2017 |
| WO | 2018/056246 A1 | 3/2018 |

OTHER PUBLICATIONS

International Search Report dated Dec. 4, 2019 for International Patent Application No. PCT/EP2019/057995 (4 pages in German with English Translation).
Written Opinion of the International Searching Authority dated Dec. 4, 2019 for International Patent Application No. PCT/EP2019/057995 (8 pages in German with English Translation).
International Preliminary Report on Patentability dated Sep. 28, 2021 for International Patent Application No. PCT/EP2019/057995 (9 pages in German with English Translation).
DIN 66132: Bestimmung der spezifischen Oberfläche von Feststoffen durch Stickstoffadsorption; Einpunkt-Differenzverfahren nach Haul und Dümbgen. [Determination of specific surface area of solids by adsorption of nitrogen; single-point differential method according to Haul and Dümbgen.] Standard by Deutsches Institut Fur Normung E.V. [German National Standard], 1975. 5 pages in German with English machine translation.
Wikipedia. Color difference. Accessed Jul. 5, 2018 https://en.wikipedia.org/wiki/Color_difference#CIE76 (6 Pages).
Non-Final Office Action dated Mar. 15, 2024 for U.S. Appl. No. 18/177,490 (25 pages).
Notice of Allowance and Fees Due mailed Nov. 23, 2022 for U.S. Appl. No. 16/954,299 (10 pages).
Notice of Allowance and Fees Due mailed Mar. 6, 2023 for U.S. Appl. No. 16/954,323 (7 pages).
Wikipedia https://de.wikipedia.org/wiki/Partikelgr%C3%B6%C3%9Fenverteilung "Partikelgrößenverteilung (Particle Size Distribution)" (14 pgs. with English Translation).
Von Johann Siebler, et al. MTZ Motortechnische Zeitschrift [Katalysatorprüfung] 1994, 55, pp. 214-218.
Non Final Office Action mailed Jul. 29, 2022 in U.S. Appl. No. 16/954,299 (7 pages).
Non Final Office Action mailed Mar. 2, 2022 in U.S. Appl. No. 16/954,299 (9 pages).
Notice of Allowance and Fees Due mailed Jul. 22, 2022 in U.S. Appl. No. 16/954,305 (5 pages).
Non Final Office Action mailed Jun. 18, 2022 in U.S. Appl. No. 16/954,305 (8 pages).
Non Final Office Action mailed Aug. 19, 2022 in U.S. Appl. No. 16/954,323 (9 pages).
Final Office Action mailed Apr. 11, 2022 in U.S. Appl. No. 16/954,323 (26 pages).
Final Office Action mailed Nov. 23, 2021 in U.S. Appl. No. 16/954,323 (24 pages).
Non Final Office Action mailed May 28, 2021 in U.S. Appl. No. 16/954,323 (24 pages).
Notice of Allowance and Fees Due mailed Jul. 26, 2022 in U.S. Appl. No. 16/954,612 (8 pages).
Non Final Office Action mailed Apr. 11, 2022 in U.S. Appl. No. 16/954,612 (9 pages).
Notice of Allowance and Fees Due mailed Aug. 2, 2021 in U.S. Appl. No. 16/954,628 (5 pages).
Non Final Office Action mailed Jun. 21, 2021 in U.S. Appl. No. 16/954,637 (7 pages).
Notice of Allowance and Fees Due mailed Dec. 1, 2021 in U.S. Appl. No. 16/954,628 (5 pages).
Non Final Office Action mailed Aug. 17, 2021 in U.S. Appl. No. 16/954,637 (8 pages).
English Translation of Chinese First Office Action dated Sep. 30, 2022 for CN 201880082178.1 (7 pages).
Chinese Search Report Dated Dec. 17, 2021 for CN 201880082071.7 (2 pages).
C3 Chinese First Office Action dated Dec. 23, 2021 for CN 201880082071.7 (7 pages in Chinese with English Translation).
Chinese Second Office Action dated Jun. 24, 2022 for CN 201880082071.7 (9 pages in Chinese with English Translation).
Supplemental Chinese Search Report Dated Jun. 15, 2022 for CN201880082071.7 (2 pages).
Chinese Search Report Dated Dec. 30, 2021 for CN 201880081450.4 (1 page).
Chinese First Office Action dated Jun. 1, 2022 for CN 201880081450.4 (5 pages in Chinese with English Translation).
Chinese Second Office Action dated Jun. 22, 2022 for CN 201880081450.4 (5 pages in Chinese with English Translation).
Chinese Search Report Dated Dec. 30, 2022 for CN 201880081997.4 (1 page).
Chinese First Office Action dated Jan. 6, 2022 for CN 201880081997.4 (6 pages in Chinese with English Translation).
Chinese Second Office Action dated Jul. 28, 2022 for CN 201880081997.4 (6 pages in Chinese with English Translation).
Chinese Office Action dated Oct. 25, 2022 for CN 201880082229.0 (5 pages in Chinese with English translation). [Family member of U.S. Appl. No. 16/954,299 which shares a common Applicant/Inventor].
Notice of Allowance and Fees Due mailed Jul. 3, 2024 for U.S. Appl. No. 18/177,490 (7 pages).
Second Office Action mailed Mar. 27, 2024 for Chinese Patent Application No. 201980094865.X (9 pages in Chinese; 11 Pages English translation).
First Office Action mailed Apr. 29, 2023 for Chinese Patent Application No. 201980094865.X (9 pages in Chinese; 9 Pages English translation).
Extended European Search Report dated Jun. 1, 2022 for European Patent Application No. 22156751.4 (10 pages in German; 10 pages English translation).
Communication from the Examining Division dated Jun. 1, 2021 for European Patent Application No. 19715057.6 (7 pages in German; 7 pages English translation).

* cited by examiner

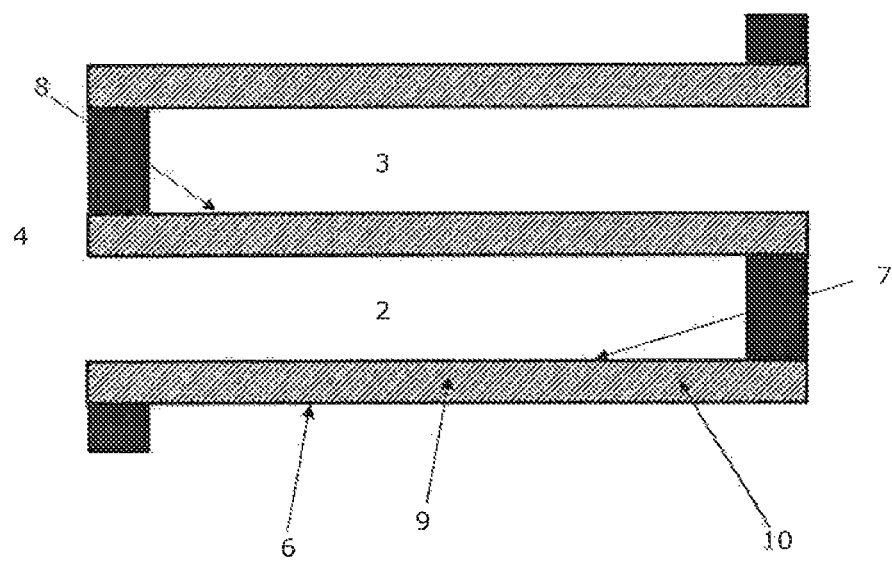

CATALYTICALLY ACTIVE PARTICULATE FILTER

The present invention relates to a catalytically active particulate filter that is particularly suitable for removing particles, carbon monoxide, hydrocarbons and nitrogen oxides out of the exhaust gas of combustion engines operated with a stoichiometric air/fuel mixture.

Exhaust gases from combustion engines, i.e., gasoline- or natural gas-fueled engines, operated with a stoichiometric air-fuel mixtures are cleaned in conventional methods with the aid of three-way catalysts. Such catalysts are capable of simultaneously converting the three major gaseous pollutants of the engine, namely hydrocarbons, carbon monoxide and nitrogen oxides, into harmless components. "Stoichiometric" means that on average exactly as much air is available for combustion of the fuel present in the cylinder as is required for complete combustion. The combustion air ratio $\lambda$ (A/F ratio; air/fuel ratio) sets the air mass $m_{L,actual}$ which is actually available for combustion in relation to the stoichiometric air mass $m_{L,st}$:

$$\lambda = \frac{m_{L,actual}}{m_{L,st}}$$

If $\lambda<1$ (e.g., 0.9), this means "air deficiency" and one speaks of a rich exhaust gas mixture; $\lambda>1$ (e.g., 1.1) means "excess air" and the exhaust gas mixture is referred to as lean. The statement $\lambda=1.1$ means that 10% more air is present than would be required for the stoichiometric reaction.

In addition to the gaseous pollutants, the exhaust gas of combustion engines also contains extremely fine particles (PM) which result from the incomplete combustion of the fuel and substantially consist of soot. In contrast to the particle emission of diesel engines, the particles in the exhaust gas of stoichiometrically operated combustion engines, such as gasoline engines, are very small and have an average particle size of less than 1 µm. Typical particle sizes range from 10 to 200 nm. Furthermore, the quantity of particles emitted is very low and ranges from 2 to 4 mg/km. The European exhaust emission standard EU-6c is associated with a conversion of the limit value for such particles from the particle mass limit value to a more critical particle number limit value of $6\times10^{11}$/km (in the Worldwide Harmonized Light Vehicles Test Cycle—WLTP). This creates a need for exhaust gas cleaning concepts for stoichiometrically operated combustion engines, which include effectively operating equipment for removing particles.

Wall-flow filters made of ceramic materials, such as silicon carbide, aluminum titanate and cordierite, have proven themselves in the field of cleaning exhaust gases from lean-burn engines, i.e., in particular diesel engines. These wall-flow filters are made up of a large number of parallel channels formed by porous walls. The channels are alternately closed at one of the two ends of the filter so that channels A, which are open at the first side of the filter and closed at the second side of the filter, and channels B, which are closed at the first side of the filter and open at the second side of the filter, are formed. For example, exhaust gas flowing into channels A can only leave the filter via channels B and must flow through the porous walls between channels A and B for this purpose. When the exhaust gas passes through the wall, the particles are retained and the exhaust gas is cleaned.

The particles retained in this manner must subsequently be burnt off or oxidized in order to prevent a clogging of the filter or an unacceptable increase in the back pressure of the exhaust system. For this purpose, the wall-flow filter is, for example, provided with catalytically active coatings that reduce the ignition temperature of soot.

Applying such coatings to the porous walls between the channels (so-called on-wall coating) or introducing them into the porous walls (so-called in-wall coating) is already known. EP1657410A2 also already describes a combination of both coating types; that is, part of the catalytically active material is present in the porous walls and another part is present on the porous walls.

The concept of removing particles out of the exhaust gas using wall-flow filters has already been applied to the cleaning of exhaust gas of combustion engines operated with a stoichiometric air/fuel mixture; see, for example, EP 2042226 A2. According to its teaching, a wall-flow filter comprises two layers arranged one above the other, wherein one can be arranged in the porous wall and the other can be arranged on the porous wall.

DE 102011050788 A1 pursues a similar concept. There, the porous filter walls contain a catalyst material of a three-way catalyst, while in addition a catalyst material of a three-way catalyst is applied to partial regions of the filter walls.

FR3020091A1 discloses a particulate filter that comprises a coating in the porous walls along with coatings on the surfaces of the input and output channels. The latter extend over a partial region of the filter length, both on the input and output surfaces on the side of the filter where the exhaust gas enters.

EP3205388A1 discloses a particulate filter which contains two coatings within the porous filter wall, each extending over only a partial region of the filter substrate, wherein the two coatings contain different precious metal species.

EP3207989A1 and EP3254757A1 disclose a particulate filter containing two coatings within the porous filter wall, each extending over only a partial region of the filter substrate, wherein the sum of the length of the two coatings is greater than the total length of the substrate but is less than twice the substrate length.

Further documents describing filter substrates provided with catalytically active coatings are EP3205388A1, EP3207977A1, EP3207978A1, EP3207987A1, EP3207989A1, EP3207990A1 and EP3162428A1, WO2016133086A1, WO2016133085A1, WO18056246A1, WO17109514A1.

There is still a need for catalytically active particulate filters that combine the functionalities of a particulate filter and of a three-way catalyst and at the same time assist in adhering to the limits that will apply in the future. The particulate filter should have as high a degree of conversion as possible for the gaseous pollutants and particles, in particular also after aging, which corresponds to a load according to the legal continuous running requirements. At the same time, the filter should have as low a dynamic pressure as possible, so that the engine power is maintained and the lowest possible fuel consumption can be realized. Surprisingly, a significant improvement in catalytic activity could be achieved by the coating of two different catalytic coatings in the porous filter wall over the entire length of the ceramic filter substrate. Compared to the prior art (WO16133085A1), filters according to the invention exhibit a significant advantage in the light-off performance after aging and in the amplitude test. An advantage of filters according to the invention under back pressure compared to zoned filters is also apparent.

The present invention therefore relates to a particulate filter for removing particles, carbon monoxide, hydrocarbons and nitrogen oxides out of the exhaust gas of combustion engines operated with a stoichiometric air/fuel mixture, comprising a wall-flow filter of length L and two different coatings Y and Z, wherein the wall-flow filter comprises channels E and A which extend in parallel between a first and a second end of the wall-flow filter and are separated by porous walls which form surfaces $O_E$ or $O_A$, and wherein the channels E are closed at the second end and the channels A are closed at the first end, wherein the two coatings Y and Z are located in the porous walls and extend from the first end of the wall-flow filter over the entire length L, and both comprise active alumina, at least one oxygen storage component and at least one platinum group metal.

The coatings Y and Z are catalytically active, in particular at operating temperatures of 250° C. to 1100° C. They contain one or more precious metals fixed to one or more carrier materials and at least one oxygen storage component. Cerium-zirconium-rare earth metal mixed oxides are considered here as oxygen storage components. The term "cerium-zirconium-rare-earth metal mixed oxide" within the meaning of the present invention excludes physical mixtures of cerium oxide, zirconium oxide, and rare earth oxide. Rather, "cerium-zirconium-rare earth metal mixed oxides" are characterized by a largely homogeneous, three-dimensional crystal structure that is ideally at least more than 90% by weight, preferably more than 95% by weight, free of phases of pure cerium oxide, zirconium oxide or rare earth oxide. Depending on the manufacturing process, however, not completely homogeneous products may arise which can generally be used without any disadvantage. In all other respects, the term "rare earth metal" or "rare earth metal oxide" within the meaning of the present invention does not include cerium or cerium oxide.

Lanthanum oxide, yttrium oxide, praseodymium oxide, neodymium oxide and/or samarium oxide can, for example, be considered as rare earth metal oxides in the cerium-zirconium-rare earth metal mixed oxides. Lanthanum oxide, yttrium oxide and/or praseodymium oxide are preferred. Lanthanum oxide and/or yttrium oxide are particularly preferred as rare earth metals in this context, and lanthanum oxide and yttrium oxide, yttrium oxide and praseodymium oxide, and lanthanum oxide and praseodymium oxide are more particularly preferred. In embodiments of the present invention, the oxygen storage components are free of neodymium oxide.

In particular, coating Z may preferably comprise one additional, i.e., two different cerium-zirconium-rare earth metal mixed oxides. The cerium-zirconium-rare earth metal mixed oxides in coating Z differ in at least one of the components contained therein. This also includes the case in which, for example, identical components are present in the two cerium-zirconium-rare earth metal mixed oxides but are present in different quantities. Surprisingly, it has been found that a combination of different cerium-zirconium-rare earth metal mixed oxides at least in the coating Z can bring about a greatly improved conversion of gaseous pollutants after hard aging.

In embodiments of the present invention, the weight ratio of active alumina to the sum of the preferably two cerium-zirconium-rare earth metal mixed oxides in coating Z is in the range from 10:90 to 60:40, preferably in the range from 20:80 to 50:50 and particularly preferably in the range from 25:75 to 35:65. In preferred embodiments, coating Z comprises in each case active, in particular lanthanum-stabilized, alumina in quantities of 10 to 60% by weight, preferably 20 to 50% by weight, particularly preferably 25 to 35% by weight, and oxygen storage components in quantities of 40 to 90% by weight, preferably 50 to 80% by weight, particularly preferably 65 to 75% by weight, in each case based on the sum of the weights of active alumina and oxygen storage components in coating Z.

Accordingly, the coating Z in embodiments preferably comprises two cerium-zirconium-rare earth metal mixed oxides that differ from one another, wherein the weight ratio of the first cerium-zirconium-rare earth metal mixed oxide to the second cerium-zirconium-rare earth metal mixed oxide is in the range from 4:1 to 1:4, preferably in the range from 3:1 to 1:3 and particularly preferably in the range from 2:1 to 1:2.

In embodiments of the present invention, coating Z comprises a first and a second cerium-zirconium-rare earth metal mixed oxide, wherein the first cerium-zirconium-rare earth metal mixed oxide preferably has a higher zirconium oxide content than the second cerium-zirconium-rare earth metal mixed oxide.

In embodiments of the present invention, coating Z comprises a first and a second cerium-zirconium-rare earth metal mixed oxide, wherein the first cerium-zirconium-rare earth metal mixed oxide preferably has a lower cerium oxide content than the second cerium-zirconium-rare earth metal mixed oxide.

In embodiments of the present invention, the weight ratio of active alumina to the sum of the preferably one cerium-zirconium-rare earth metal mixed oxide in the coating Y is in the range from 25:75 to 75:25, preferably in the range from 70:30 to 30:70 and particularly preferably in the range from 65:35 to 35:65. In preferred embodiments, the coating Y in each case comprises in particular lanthanum-stabilized alumina in quantities of 25 to 70% by weight, preferably 30 to 65% by weight, particularly preferably 35 to 60% by weight, and oxygen storage components in quantities of 30 to 75% by weight, preferably 35 to 70% by weight, particularly preferably 40 to 65% by weight, in each case based on the sum of the weights of active alumina and oxygen storage components in the coating Y.

In embodiments of the present invention, coating Z is preferably first introduced into the pores of the filter wall of the substrate before the coating Y is subsequently introduced into the filter wall containing the coating Z. In doing so, coating Y is preferably applied in the opposite coating direction to coating Z.

In a further advantageous embodiment of the present invention, coating Y is first introduced into the pores of the filter wall of the substrate before the coating Z is subsequently introduced into the filter wall containing coating Y. Here, too, the coating with the second coating is carried out counter to that of the first one.

In accordance with the invention, the cerium oxide to zirconium oxide mass ratio in the cerium-zirconium-rare earth metal mixed oxides of coatings Y or Z can vary within wide limits. It is, for example, 0.1 to 1.5, preferably 0.2 to 1.25 or 0.3 to 1. It is furthermore preferred that the first cerium-zirconium-rare earth metal mixed oxide of coating Z has a cerium oxide to zirconium oxide weight ratio of 0.1 to 0.7, which is smaller than that in the second cerium-zirconium-rare earth metal mixed oxide, which has a cerium oxide to zirconium oxide weight ratio of 0.5 to 1.5. Further, more preferred embodiments contain in coating Z a first cerium-zirconium-rare earth metal mixed oxide with a cerium oxide to zirconium oxide weight ratio of 0.2 to 0.6 and a second cerium-zirconium-rare earth metal mixed oxide with a cerium oxide to zirconium oxide weight ratio of 0.6 to 1.2. Still other most preferred embodiments include a first cerium-zirconium-rare earth metal mixed oxide with a cerium oxide to zirconium oxide weight ratio of 0.3 to 0.5, and the second cerium-zirconium-rare earth metal mixed oxide has a cerium oxide to zirconium oxide weight ratio of 0.7 to 1.0. Furthermore, it is preferred if the cerium-zirconium-rare earth metal mixed oxide of coating Y has a cerium oxide to zirconium oxide weight ratio of 0.1 to 0.7, preferably a cerium oxide to zirconium oxide weight ratio of 0.2 to 0.6 and particularly preferably a cerium oxide to zirconium oxide weight ratio of 0.3 to 0.5.

In a preferred embodiment, the particulate filter according to the invention is designed such that the first cerium-zirconium-rare earth metal mixed oxide of coating Z has a cerium oxide content of 10% to 40% based on the weight of the first cerium-zirconium-rare earth metal mixed oxide, more preferably of 15% to 35% and most particularly preferably of 20% to 30% based on the weight of the first cerium-zirconium-rare earth metal mixed oxide.

In contrast, the zirconium oxide content in the first cerium-zirconium-rare earth metal mixed oxide of coating Z is 40% to 90% based on the weight of the first cerium-zirconium-rare earth metal mixed oxide. It is advantageous if the zirconium oxide content in the first cerium-zirconium-rare earth metal mixed oxide of coating Z is between 50% and 75%, most 55% to 65%, based on the weight of the first cerium-zirconium-rare earth metal mixed oxide.

Likewise, a cerium oxide content of 35% to 65% based on the weight of the second cerium-zirconium-rare earth metal mixed oxide should prevail in the second cerium-zirconium-rare earth metal mixed oxide of coating Z. It is more advantageous if a cerium oxide content of 15% to 55%, most preferably 20% to 50%, based on the weight of the second cerium-zirconium-rare earth metal mixed oxide is present in the second cerium-zirconium-rare earth metal mixed oxide of coating Z.

In contrast, the zirconium oxide content in the second cerium-zirconium-rare earth metal mixed oxide of coating Z is 20% to 60% based on the weight of the first cerium-zirconium-rare earth metal mixed oxide. It is advantageous if the zirconium oxide content in the first cerium-zirconium-rare earth metal mixed oxide of coating Z is between 40% and 70%, most 50% to 65%, based on the weight of the first cerium-zirconium-rare earth metal mixed oxide.

In a preferred embodiment, the particulate filter according to the invention is designed such that the in particular one cerium-zirconium-rare earth metal mixed oxide of coating Y has a cerium oxide content of 10% to 40% based on the weight of the cerium-zirconium-rare earth metal mixed oxide, more preferably of 15% to 35% and most particularly preferably of 20% to 30% based on the weight of the cerium-zirconium-rare earth metal mixed oxide.

In contrast, the zirconium oxide content in the preferably one cerium-zirconium-rare earth metal mixed oxide of coating Y is 40% to 90% based on the weight of the cerium-zirconium-rare earth metal mixed oxide. It is advantageous if the zirconium oxide content in the preferably one cerium-zirconium-rare earth metal mixed oxide of coating Y is between 50% and 75%, most 55% to 65%, based on the weight of the first cerium-zirconium-rare earth metal mixed oxide.

It is furthermore preferred according to the invention if all cerium-zirconium-rare earth metal mixed oxides used in the coatings Y and Z are doped with lanthanum oxide so that preferably the lanthanum oxide content >0% by weight to 10% by weight, most particularly preferably from 1% by weight to 8% by weight (based on the respective mixed oxide). Particularly more advantageously, these lanthanum oxide-containing cerium-zirconium-rare earth metal mixed oxides have a lanthanum oxide to cerium oxide mass ratio of 0.05 to 0.5.

In particularly preferred embodiments of the present invention, coating Z comprises lanthanum-stabilized alumina as well as platinum, palladium or platinum and palladium, and two different oxygen storage components comprising zirconium oxide, cerium oxide, lanthanum oxide and yttrium oxide or praseodymium oxide.

In particularly preferred embodiments of the present invention, coating Y comprises lanthanum-stabilized alumina as well as palladium, rhodium or palladium and rhodium and an oxygen storage component comprising zirconium oxide, cerium oxide, lanthanum oxide and yttrium oxide or praseodymium oxide.

The cerium-zirconium-rare earth metal mixed oxides of coating Z or Y are preferably doped with a second rare earth metal in addition to lanthanum oxide. A preferred particulate filter has a content of the second rare earth metal of the respective cerium-zirconium-rare earth metal mixed oxide of between 2% to 25% based on the weight of the respective cerium-zirconium-rare earth metal mixed oxide. It is more advantageous if the content of the second rare earth metal is 3% to 20%, most preferably 4% to 15%, based on the weight of the respective cerium-zirconium-rare earth metal mixed oxide in coatings Z or Y.

The first cerium-zirconium-rare earth metal mixed oxide of coating Z is preferably doped with yttrium oxide in addition to lanthanum oxide. A preferred particulate filter has an yttrium oxide content in the first cerium-zirconium-rare earth metal mixed oxide of coating Z of 2% to 25% based on the weight of the first cerium-zirconium-rare earth metal mixed oxide. More preferably, the yttrium oxide content of the first cerium-zirconium-rare earth metal mixed oxide of coating Z is between 3% and 20%, most preferably 4% to 15%, based on the weight of the first cerium-zirconium-rare earth metal mixed oxide. The lanthanum oxide to yttrium oxide weight ratio is in particular 0.1 to 1, preferably 0.15 to 0.8 and most preferably 0.2 to 0.5.

An embodiment in which the second cerium-zirconium-rare earth metal mixed oxide of coating Z is doped not only with lanthanum oxide but also with a further metal oxide from the group of rare earth metal oxides, preferably with praseodymium, is also advantageous. A preferred particulate filter has a praseodymium content in the second cerium-zirconium-rare earth metal mixed oxide of coating Z of in particular 2 to 10% by weight, more preferably 3 to 9% by weight and most preferably 4 to 8% by weight based on the weight of the cerium-zirconium-rare earth metal mixed oxide. The lanthanum oxide to praseodymium oxide weight ratio is in particular 0.1 to 2.0, preferably 0.2 to 1.8 and most preferably 0.5 to 1.5.

In embodiments of the present invention, the zirconium oxide content of the yttrium oxide-containing oxygen storage component is greater in coating Z than the zirconium oxide content of the praseodymium oxide-containing oxygen storage component, in each case based on the respective oxygen storage component.

The preferably one cerium-zirconium-rare earth metal mixed oxide of coating Y is preferably doped with yttrium oxide in addition to lanthanum oxide. A preferred particulate filter has an yttrium oxide content in the cerium-zirconium-rare earth metal mixed oxide of coating Y of 2% to 25% based on the weight of the cerium-zirconium-rare earth metal mixed oxide of coating Y. More preferably, the yttrium oxide content of the preferably one cerium-zirconium-rare earth metal mixed oxide of coating Y is between 4% and 20%, most preferably 10% and 15%, based on the weight of the cerium-zirconium-rare earth metal mixed oxide. The lanthanum oxide to yttrium oxide weight ratio is in particular 0.1 to 1, preferably 0.15 to 0.8 and most preferably 0.2 to 0.5.

In embodiments of the present invention, the yttrium oxide content in the first oxygen storage component of the coating Z is the same as or greater than the yttrium oxide content in the oxygen storage component of the coating Y, based in each case on the weight of the respective oxygen storage component. In embodiments of the present invention, the mass fraction of yttrium oxide is greater in the coating Y than in the coating Z.

In one embodiment of the particulate filter according to the invention, the coatings Y and Z contain precious metals as catalytically active elements. Platinum, palladium and rhodium or mixtures thereof are in particular suitable for this purpose, palladium, rhodium, palladium and rhodium, or platinum, palladium and rhodium being preferred, and palladium and rhodium being particularly preferred. Furthermore, all cerium-zirconium-rare earth metal mixed oxides in coating Y and Z may each be activated with palladium or rhodium, or palladium and rhodium. Platinum may optionally also be present. The precious metals are usually used in quantities of 0.15 to 5 g/l based on the volume of the wall-flow filter. In a preferred embodiment, 100% of the total rhodium fraction is located in the layer Y and 30-100% of the total palladium fraction is located in the layer Z. In a particularly preferred embodiment, 100% of the total rhodium fraction is located in the layer Y and 45-100% of the total palladium section is located in the layer Z.

It is preferred for the catalytically active coatings to be located in the pores of the porous wall of a wall-flow filter. Only small portions can be present on the wall due to the coating process. According to the invention, >90%, more preferably >95%, of coating Z or Y is present in the pores of the wall. An evaluation can take place via a computerized image analysis based on SEM images of grindings of the coated walls (DE102018111246). Corresponding images of the grinding of an inlet and outlet channel were taken in the process. In this type of analysis, the average color of the wall surface of the non-coated channel is determined as a reference value. This reference value is subtracted from the corresponding image of the coated regions, wherein the color difference was defined according to CIE76 of the International Commission on Illumination with a lowest still distinguishable color difference of 2.33 (https://en.wikipedia.org/wiki/Color_difference#CIE76).

As carrier materials for the precious metals, all materials familiar to the person skilled in the art for this purpose can be considered. Such materials are in particular metal oxides with a BET surface area of 30 to 250 m$^2$/g, preferably 100 to 200 m$^2$/g (determined according to DIN 66132, latest version as of filing date).

Particularly suitable carrier materials for the precious metals are selected from the series consisting of alumina, doped alumina, silicon oxide, titanium dioxide and mixed oxides of one or more thereof.

Doped aluminas are, for example, aluminas doped with lanthanum oxide, barium oxide, zirconium oxide, silicon oxide and/or titanium oxide. Lanthanum-stabilized alumina is advantageously used, wherein lanthanum is used in quantities of 1 to 10% by weight, preferably 3 to 6% by weight, in each case calculated as $La_2O_3$ and based on the weight of the stabilized alumina.

Coating Z usually contains oxygen storage components in quantities of 10 to 85 g/l based on the volume of the wall-flow filter.

Coating Y usually contains oxygen storage components in quantities of 10 to 75 g/l based on the volume of the wall-flow filter.

The mass ratio of carrier materials and oxygen storage components in coating Z is usually 0.2 to 1.5, for example 0.3 to 0.8. The mass ratio of carrier materials and oxygen storage components in coating Y is usually 0.2 to 1.5, for example 0.3 to 0.8.

In embodiments of the present invention, coating Z contains one or more alkaline earth compounds, such as strontium oxide, barium oxide or barium sulfate. The quantity of barium sulfate per coating is, in particular, 1 to 15 g/l, preferably 5 to 10 g/l volume of the wall-flow filter. Coating Z contains, in particular, strontium oxide or barium oxide. In a particularly preferred embodiment, the coating Y does not contain any alkaline earth compounds, such as strontium oxide, barium oxide or barium sulfate, in particular no barium compounds.

In further embodiments of the present invention, the coatings Y and Z contain additives, such as rare earth compounds, for example stabilizers, such as lanthanum oxide, and/or binders, such as aluminum compounds. Such additives are used in quantities that may vary within wide limits and that the person skilled in the art can determine by simple means in the specific case.

According to the present invention, coating Z extends from the first end of the wall-flow filter over the entire length L of the wall-flow filter. The loading of the wall-flow filter with coating Z is preferably 20 to 120 g/l based on the volume of the wall-flow filter.

According to the present invention, coating Y extends from the second end of the wall-flow filter over the entire length L of the wall-flow filter. The loading of the wall-flow filter with coating Z is preferably 20 to 120 g/l based on the volume of the wall-flow filter. The total washcoat loading of the particulate filter according to the invention is in particular 40 to 150 g/l based on the volume of the wall-flow filter.

In a preferred embodiment of the particulate filter according to the invention, the ratio of the applied quantity of coating Z to the applied quantity of coating Y is in the range of 3:1 to 1:3, preferably 2:1 to 1:2. In embodiments of the present invention, neither coating Z nor coating Y contain a zeolite or a molecular sieve.

The present invention relates in particular to a particulate filter for removing particles, carbon monoxide, hydrocarbons and nitrogen oxides out of the exhaust gas of combustion engines operated with a stoichiometric air/fuel mixture, which filter comprises a wall-flow filter of length L and two different coatings Y and Z, wherein the wall-flow filter comprises channels E and A which extend in parallel between a first and a second end of the wall-flow filter and are separated by porous walls which form surfaces OE or OA, and wherein the channels E are closed at the second end and the channels A are closed at the first end, and in which the two coatings Y and Z are located in the porous walls and extend from the first end of the wall-flow filter over the entire length L and both comprise active alumina, at least one cerium-zirconium-rare earth metal mixed oxide and at least one platinum group metal, wherein layer Z is free of rhodium, and that the ratio of the applied quantity of coating Z to the applied quantity of coating Y is in the range from 3:1 to 1:3. It should be noted that the preferred embodiments mentioned above also relate mutatis mutandis to the embodiment mentioned here.

Wall-flow filters that can be used in accordance with the present invention are known and available on the market. They consist, for example, of silicon carbide, aluminum titanate or cordierite, for example having a cell density of 200 to 400 cells per square inch (cpsi), i.e., approximately 30 to 60 cells per cm², and usually a wall thickness of between 6 and 12 mil, or 0.1524 and 0.305 mm. In the uncoated state, they have porosities of 50% to 80%, in particular 55% to 75%, for example. In the uncoated state, their average pore size is, for example, 10 to 25 micrometers.

Generally, the pores of the wall-flow filter are so-called open pores, that is, they have a connection to the channels. Furthermore, the pores are generally interconnected with one another. This enables, on the one hand, easy coating of the inner pore surfaces and, on the other hand, easy passage of the exhaust gas through the porous walls of the wall-flow filter.

The particulate filter according to the invention can be produced by methods known to the person skilled in the art, for example by applying a coating suspension, which is usually referred to as a washcoat, to the wall-flow filter by means of one of the usual dip coating methods or pump and suction coating methods. Thermal post-treatment or calcination usually follow.

The person skilled in the art knows that the average pore size of the wall-flow filter and the average particle size of the catalytically active materials must be matched to one another in order to achieve an on-wall coating or an in-wall coating. In the case of an in-wall coating, the average particle size of the catalytically active materials must be small enough to penetrate the pores of the wall-flow filter. In contrast, in the case of an on-wall coating, the average particle size of the catalytically active materials must be large enough not to penetrate the pores of the wall-flow filter.

In embodiments of the present invention, the coating suspensions for the production of the coatings Y and Z are preferably ground to a particle size distribution of d50 between 1 to 2 μm and $d_{50}$ between 6 to 7 μm (Q3 distribution; DIN 66161, latest version on the filing date).

The particulate filter according to the invention is perfectly suitable for removing particles, carbon monoxide, hydrocarbons and nitrogen oxides out of the exhaust gas of combustion engines operated with a stoichiometric air/fuel mixture.

The present invention thus also relates to a method for removing particles, carbon monoxide, hydrocarbons and nitrogen oxides out of the exhaust gas of combustion engines operated with a stoichiometric air/fuel mixture, characterized in that the exhaust gas is passed over a particulate filter according to the invention.

The exhaust gas can be passed over a particulate filter according to the invention in such a way that it enters the particulate filter through channels E and leaves it again through channels A.

However, it is also possible for the exhaust gas to enter the particulate filter through channels A and to leave it again through channels E. In a particularly preferred embodiment, the coating Z is contacted first by the exhaust gas, thus forming the coating in the inlet channels.

FIG. 1 shows a particulate filter comprising a wall-flow filter of length L (1) and two different coatings Y and Z, wherein the wall-flow filter comprises channels E (2) and A (3) which extend in parallel between a first (4) and a second end (5) of the wall-flow filter and are separated by porous walls (6) which form surfaces $O_E$ (7) or $O_A$ (8), and wherein the channels E are closed at the second end and the channels A are closed at the first end, characterized in that the two coatings Y (9) and Z (10) are located in the porous walls and extend from the first end of the wall-flow filter over the entire length L.

The invention is explained in more detail in the following examples.

EXAMPLES

Five filters each were provided with different catalytically active coatings. Ceramic wall-flow filters of highly porous cordierite having a diameter of 11.84 cm and a length of 15.24 cm and a cell density of 300 cpsi (46.5 cells per cm²) and a wall thickness of 8.5 mil, i.e., 0.02 mm, were in each case used as filter substrates. Each filter was provided with a coating of 100 g/l based on the filter volume.

Comparative Example 1

Alumina stabilized with lanthanum oxide was suspended in water together with a first oxygen storage component comprising 40% by weight cerium oxide, 50% by weight zirconium oxide, 5% by weight lanthanum oxide and 5% by weight praseodymium oxide, and a second oxygen storage component comprising 24% cerium oxide, 60% by weight zirconium oxide, 3.5% by weight lanthanum oxide and 12.5% by weight yttrium oxide. Both oxygen storage components were used in equal parts. The weight ratio of alumina to oxygen storage components was 30:70. The suspension thus obtained was subsequently mixed with a palladium nitrate solution and a rhodium nitrate solution under constant stirring. The resulting coating suspension was used directly for coating a commercially available wall-flow filter substrate, wherein the coating was introduced into the porous filter wall over 100% of the substrate length from both directions (outlet and inlet). The total loading of this filter was 100 g/l; the precious metal loading was 1.589 g/l having a palladium to rhodium ratio of 3.5:1. The coated filter thus obtained was dried and subsequently calcined.

Comparative Example 2

In embodiments of the present invention, two different coatings Y and Z are introduced into the porous filter wall over 60% of the substrate length in each case. First, alumina stabilized with lanthanum oxide was suspended in water together with a first oxygen storage component comprising 40% by weight cerium oxide, 50% by weight zirconium oxide, 5% by weight lanthanum oxide and 5% by weight praseodymium oxide, and a second oxygen storage component comprising 24% cerium oxide, 60% by weight zirconium oxide, 3.5% by weight lanthanum oxide and 12.5% by weight yttrium oxide. Both oxygen storage components were used in equal parts. The weight ratio of alumina to oxygen storage components was 30:70. The suspension thus obtained was subsequently mixed with a palladium nitrate solution under constant stirring. The resulting coating suspension Z was used directly for coating a commercially available wall-flow filter substrate, wherein the coating took place over 60% of the substrate length starting from the inlet channel into the porous filter wall. The loading of coating Z was 50 g/l. The coated filter thus obtained was dried and subsequently calcined.

In coating Y, was alumina stabilized with lanthanum oxide was suspended in water together with a first oxygen storage component containing 24% by weight cerium oxide, 60% by weight zirconium oxide, 3.5% by weight lanthanum oxide and 12.5% by weight yttrium oxide. The weight ratio of alumina to oxygen storage components was 55:45. The suspension thus obtained was subsequently mixed with a rhodium nitrate solution under constant stirring. The resulting coating suspension was coated onto a commercially available wall-flow filter substrate already containing coating Z, wherein the coating was introduced into the porous filter wall over 60% of the substrate length starting from the outlet channel. The loading of coating Y was 50 g/l. The total loading of this filter was 100 g/l; the precious metal loading was 1.589 g/l having a palladium to rhodium ratio of 3.5:1. The coated filter thus obtained was dried and subsequently calcined.

Example 1 According to the Invention

In embodiments of the present invention, two different coatings Y and Z are introduced into the porous filter wall over 100% of the substrate length. First, alumina stabilized with lanthanum oxide was suspended in water together with a first oxygen storage component comprising 40% by weight cerium oxide, 50% by weight zirconium oxide, 5% by weight lanthanum oxide and 5% by weight praseodymium oxide, and a second oxygen storage component comprising 24% cerium oxide, 60% by weight zirconium oxide, 3.5% by weight lanthanum oxide and 12.5% by weight yttrium oxide. Both oxygen storage components were used in equal parts. The weight ratio of alumina to oxygen storage components was 30:70. The suspension thus obtained was subsequently mixed with a palladium nitrate solution under constant stirring. The resulting coating suspension was used directly for coating a commercially available wall-flow filter substrate, wherein the coating took place over 100% of the substrate length into the porous filter wall. The loading of coating Z was 50 g/l. The coated filter thus obtained was dried and subsequently calcined.
In coating Y, was alumina stabilized with lanthanum oxide was suspended in water together with a first oxygen storage component containing 24% by weight cerium oxide, 60% by weight zirconium oxide, 3.5% by weight lanthanum oxide and 12.5% by weight yttrium oxide. The weight ratio of alumina to oxygen storage components was 55:45. The suspension thus obtained was subsequently mixed with a rhodium nitrate solution under constant stirring. The resulting coating suspension was coated onto a commercially available wall-flow filter substrate already containing coating Z, wherein the coating was introduced into the porous filter wall over 100% of the substrate length. The loading of coating Y was 50 g/l. The total loading of this filter was 100 g/l; the precious metal loading was 1.589 g/l having a palladium to rhodium ratio of 3.5:1. The coated filter thus obtained was dried and subsequently calcined.

Example 1 according to the invention and Comparative Example 1 exhibit similar dynamic pressures, while Comparative Example 2 exhibits a higher dynamic pressure, particularly at 600 m³/h.

TABLE 1

Dynamic pressure measured at 300 m³/h and 600³ m/h.

| | 300 m³/h | 600 m³/h |
|---|---|---|
| Comparative Example 1 | 11 mbar ± 0.3 mbar | 35.5 mbar ± 0.3 mbar |
| Comparative Example 2 | 12.4 mbar ± 0.4 mbar | 38.0 mbar ± 0.5 mbar |
| Example 1 | 11.0 mbar ± 0.5 mbar | 36 mbar ± 0.6 mbar |

In order to determine the catalytic properties of the filter according to the invention, a filter each of Comparative Example 1 and Example 1 was aged in an engine test bench aging process. The aging process consists of an overrun cut-off aging process at an exhaust gas temperature of 950° C. before the catalyst input (maximum bed temperature of 1030° C.). The aging time was 38 hours. Subsequently, an engine test bench was used to test the light-off performance at a constant average air ratio λ and the dynamic conversion with a change of λ.

Table 2 contains the temperatures $T_{50}$ at which 50% of the considered component are in each case converted. Here, the light-off performance with a stoichiometric exhaust gas composition (λ=0.999 with ±3.4% amplitude) was determined.

TABLE 2

Results of the light-off performance after aging for Example 1 and Comparative Examples 1 and 2

| | $T_{50}$ HC stoichiometric | $T_{50}$ CO stoichiometric | $T_{50}$ NOx stoichiometric |
|---|---|---|---|
| Comparative Example 1 | 385 | 391 | 392 |
| Comparative Example 2 | 363 | 373 | 366 |
| Example 1 | 355 | 359 | 356 |

Example 1 according to the invention exhibits a significant improvement in temperatures $T_{50}$ by 30° C. for all components considered (HC, CO, and NOx).

Furthermore, the filters were subjected to a so-called amplitude test which provides information about the dynamic oxygen storage capacity. Here, the lambda is acted on by three different amplitudes of 2, 3.4 and 6.8% and the respective damping by the catalyst is determined. Table 2 shows the damping behavior of the three examples.

TABLE 3

Results of the amplitude test after aging for Example 1 and Comparative Examples 1 and 2

| | 2% | 3.4% | 6.8% |
|---|---|---|---|
| Comparative Example 1 | 0.10 | 0.11 | 0.19 |
| Comparative Example 2 | 0.18 | 0.14 | 0.12 |
| Example 1 | 0.07 | 0.07 | 0.08 |

Example 1 according to the invention exhibits a significantly stronger damping of the lambda amplitude and thus a higher dynamic oxygen storage capacity than the two Comparative Examples 1 and 2.

The invention claimed is:
1. Particulate filter for removing particles, carbon monoxide, hydrocarbons, and nitrogen oxides out of the exhaust gas of combustion engines operated with a stoichiometric air/fuel mixture, comprising a wall-flow filter of length L and two different coatings Y and Z, wherein the wall-flow filter comprises channels E and A which extend in parallel between a first and a second end of the wall-flow filter and are separated by porous walls which form surfaces OE or OA, and wherein the channels E are closed at the second end and the channels A are closed at the first end, characterized in that
the two coatings Y and Z are located in the porous walls and extend from the first end of the wall-flow filter over the entire length L and both comprise active alumina, at least one oxygen storage material, and at least one platinum group metal, and wherein the at least one oxygen storage material in coating Z comprises two different cerium-zirconium-rare earth metal mixed oxides.

2. Particulate filter according to claim 1,
characterized in that
the weight ratio of active alumina to the sum of the two different cerium-zirconium-rare earth metal mixed oxides of coating Z is in the range from 10:90 to 60:40.

3. Particulate filter according to claim 1,
wherein the weight ratio of a first cerium-zirconium-rare earth metal mixed oxide of the two different cerium-zirconium-rare earth metal mixed oxides of coating Z to a second cerium-zirconium-rare earth metal mixed oxide of the two different cerium-zirconium-rare earth metal mixed oxides of coating Z is in the range from 4:1 to 1:4.

4. Particulate filter according to claim 1,
wherein a first cerium-zirconium-rare earth metal mixed oxide of the two different cerium-zirconium-rare earth metal mixed oxides of coating Z has a higher zirconium oxide content than a second cerium-zirconium-rare earth metal mixed oxide of the two different cerium-zirconium-rare earth metal mixed oxides of coating Z.

5. Particulate filter according to claim 1,
wherein a first cerium-zirconium-rare earth metal mixed oxide of the two different cerium-zirconium-rare earth metal mixed oxides of coating Z has a lower cerium oxide content than a second cerium-zirconium-rare earth metal mixed oxide of the two different cerium-zirconium-rare earth metal mixed oxides of coating Z.

6. Particulate filter according to claim 1, wherein the at least one oxygen storage material in coating Y comprises at least one cerium-zirconium-rare earth metal mixed oxide.

7. Particulate filter according to claim 1,
characterized in that
a first cerium-zirconium-rare earth metal mixed oxide of the two different cerium-zirconium-rare earth metal mixed oxides of coating Z has a cerium oxide to zirconium oxide weight ratio of 0.1 to 0.7, which is smaller than that in a second cerium-zirconium-rare earth metal mixed oxide of the two different cerium-zirconium-rare earth metal mixed oxides of coating Z, which has a cerium oxide to zirconium oxide weight ratio of 0.5 to 1.5.

8. Particulate filter according to claim 6,
characterized in that
the at least one cerium-zirconium-rare earth metal mixed oxide of coating Y has a cerium oxide to zirconium oxide weight ratio of 0.1 to 0.7.

9. Particulate filter according to claim 6,
characterized in that
all cerium-zirconium-rare earth metal mixed oxides in coatings Y and Z are doped with lanthanum oxide.

10. Particulate filter according to claim 1,
wherein a first cerium-zirconium-rare earth metal mixed oxide of the two different cerium-zirconium-rare earth metal mixed oxides of coating Z is doped with lanthanum oxide as well as 2% to 25% yttrium oxide based on the weight of the first cerium-zirconium-rare earth metal mixed oxide.

11. Particulate filter according to claim 10,
wherein a second cerium-zirconium-rare earth metal mixed oxide of the two different cerium-zirconium-rare earth metal mixed oxide of coating Z is doped with lanthanum oxide as well as 2% to 10% praseodymium oxide based on the weight of the second cerium-zirconium-rare earth metal mixed oxide.

12. Particulate filter according to claim 6,
wherein the at least one cerium-zirconium-rare earth metal mixed oxide of coating Y is doped with lanthanum oxide as well as 2% to 25% yttrium oxide based on the weight of the at least one first cerium-zirconium-rare earth metal mixed oxide yttrium oxide of coating Y.

13. Particulate filter according to claim 12,
wherein a first cerium-zirconium-rare earth metal mixed oxide of the two different cerium-zirconium-rare earth metal mixed oxides of coating Z comprises yttrium oxide, and
the mass fraction of yttrium oxide is greater in the coating Y than in the coating Z.

14. Particulate filter according to claim 1,
wherein each of the two different cerium-zirconium-rare earth metal mixed oxides of coating Z are activated with palladium, platinum, or palladium and platinum.

15. Particulate filter according to claim 6,
characterized in that
each cerium-zirconium-rare earth metal mixed oxide of the coatings Y and Z is activated with palladium or rhodium, or palladium and rhodium.

16. Particulate filter according to claim 1,
characterized in that the ratio of the applied quantity of coating Z to the applied quantity of coating Y is in the range from 3:1 to 1:3.

17. Method for removing particles, carbon monoxide, hydrocarbons and nitrogen oxides out of the exhaust gas of combustion engines operated with a stoichiometric air/fuel mixture, characterized in that the exhaust gas is passed over a particulate filter according to claim 1.

18. Particulate filter according to claim 6,
characterized in that
the weight ratio of active alumina to the at least one cerium-zirconium-rare earth metal mixed oxide in coating Y is in the range from 25:75 to 75:25.

19. Particulate filter for removing particles, carbon monoxide, hydrocarbons and nitrogen oxides out of the exhaust gas of combustion engines operated with a stoichiometric air-fuel mixture, comprising a wall-flow filter of length L and two different coatings Y and Z, wherein the wall-flow filter comprises channels E and A which extend in parallel between a first and a second end of the wall-flow filter and are separated by porous walls which form surfaces OE and OA, and wherein the channels E are closed at the second end and the channels A are closed at the first end, characterized in that the two coatings Y and Z are located in the porous walls and extend from the first end of the wall-flow filter over the entire length L and both comprise active alumina, at least one cerium-zirconium-rare earth metal mixed oxide and at least one platinum group metal, wherein layer Z is free of rhodium, and that the ratio of the applied quantity of coating Z to the applied quantity of coating Y is in the range from 3:1 to 1:3, and wherein the at least one cerium-zirconium-rare earth metal mixed oxide in coating Z comprises two different cerium-zirconium-rare earth metal mixed oxides.

20. Particulate filter according to claim 19, wherein,
a first cerium-zirconium-rare earth metal mixed oxide of the two different cerium-zirconium-rare earth metal mixed oxides of coating Z is doped with lanthanum oxide as well as 2% to 25% yttrium oxide based on the weight of the first cerium-zirconium-rare earth metal mixed oxide; and wherein a second cerium-zirconium-rare earth metal mixed oxide of the two different cerium-zirconium-rare earth metal mixed oxides of coating Z is doped with lanthanum oxide as well as 2% to 10% praseodymium oxide based on the weight of the second cerium-zirconium-rare earth metal mixed oxide.

* * * * *